(12) United States Patent
Chiang

(10) Patent No.: US 6,271,822 B1
(45) Date of Patent: Aug. 7, 2001

(54) DIGITAL LIQUID CRYSTAL DISPLAY DRIVING CIRCUIT

(75) Inventor: Tsung-Pei Chiang, Hsinchu Hsien (TW)

(73) Assignee: Unipac Optoelectronics Corp., Hsinchu (TW)

(*) Notice: Subject to any disclaimer, the term of this patent is extended or adjusted under 35 U.S.C. 154(b) by 0 days.

(21) Appl. No.: 09/235,265

(22) Filed: Jan. 22, 1999

(30) Foreign Application Priority Data

Jan. 26, 1998 (TW) .................................................. 87101053

(51) Int. Cl.$^7$ ...................................................... G09G 3/36
(52) U.S. Cl. ...................................... 345/99; 345/1; 345/3
(58) Field of Search ................................ 345/99, 100, 87, 345/89, 98, 1, 2, 3, 55, 211, 213

(56) References Cited

U.S. PATENT DOCUMENTS

| | | | |
|---|---|---|---|
| 5,644,329 | * 7/1997 | Asari et al. | 345/100 |
| 6,046,719 | * 4/2000 | Dingwall | 345/100 |
| 6,115,084 | * 9/2000 | Miyashita et al. | 345/100 |

* cited by examiner

Primary Examiner—Dennis-Doon Chow
(74) Attorney, Agent, or Firm—Jiawei Huang; J.C Patents

(57) ABSTRACT

A digital liquid crystal display (LCD) driving circuit is provided for driving an LCD to display video images. The LCD driving circuit comprises a digital gamma-correction and inversion circuit for performing a digital gamma-correction process on the digitized video signal and then performing a polarity inversion process on selected lines of the video signal. The digital gamma-correction and inversion circuit is coupled directly to a display memory unit so as to fetch the digitized video signal directly from the display memory unit. A digital-to-analog conversion means is coupled to the digital gamma-correction and inversion circuit for converting the digital output of the digital gamma-correction and inversion circuit into analog form. Further, the LCD driving circuit comprises an LCD timing control circuit, which is coupled to receive a plurality of video control signals associated with the digitized video signal, for converting the video control signals into an LCD timing control signal to control the LCD to display the video signal. Still further, the LCD driving circuit comprises a PWM and shutdown circuit for supplying power to the LCD and shutting down the LCD when the LCD has been idle for a preset period. Most of the constituent circuit components of the LCD driving circuit can be implemented in a single LSI integrated circuit. The LCD driving circuit is therefore compact in size, low in manufacturing cost, and low in power consumption.

11 Claims, 2 Drawing Sheets

DIGITAL LIQUID CRYSTAL DISPLAY DRIVING CIRCUIT

CROSS-REFERENCE TO RELATED APPLICATION

This application claims the priority benefit of Taiwan application serial no. 87101053,filed Jan. 26, 1998, the fill disclosure of which is incorporated herein by reference.

BACKGROUND OF THE INVENTION

1. Field of the Invention

This invention relates to liquid crystal displays (LCD), and more particularly, to a digital LCD driving circuit for driving an LCD to display video images. In practice, the LCD driving circuit of the invention can be implemented in an LSI (large scale integration) integrated circuit that processes the video signal and associated control signals in a digital manner such that the driving circuit can be operated without laborious analog adjustments and allow the displayed video image to have higher fidelity.

2. Description of Related Art

Conventional digital display systems, such as digital cameras, image telephones, video CD (compact disc) players, global positioning systems (GPS), and so on, are typically provided with a cathode ray tube television (CRT TV) in conjunction with an LCD for displaying video images. The CRT TV is a display device which is devised to process composite video signals (abbreviated as Cvideo) in compliance with standard television standards, such as the NTSC (National Television System Committee), SECAM (Sequential Chrominance And Memory), and PAL (Phase Alternation by Line) standards. A Cvideo signal is composed of a horizontal synchronizing signal (Hs), a vertical synchronizing signal (Vs), a clock signal (CLK) and the RGB signals of the video image.

FIG. 1 is a schematic block diagram of a conventional display driving circuit for driving a CRT TV and an LCD to display video images. As shown, a composite synchronizing signal generator 102 is used to combine a horizontal synchronizing signal, a vertical synchronizing signal and a clock signal CLK into a composite synchronizing signal Csync. Meanwhile, the data of a digital dot matrix (i.e., the video image to be displayed on the CRT TV and LCD) stored in the display memory unit 103 are converted by the digital-to-analog (D/A) converter 104 into analog form and then transferred to the video encoder 105.

The video encoder 105 then processes the analog output from the D/A converter 104 and the Csync signal from the composite synchronizing signal generator 102 to thereby produce a composite video signal Cvideo. The Cvideo signal is used directly to drive the CRT TV to display the video image. It is also transferred to the LCD driving circuit (the bottom part of the circuit of FIG. 1) for further processing to obtain a suitable signal form that can be used to drive the LCD.

Alternately, the Cvideo signal can be generated through another method, for which the circuit components involved are drawn in dashed lines in FIG. 1. As shown, a digital encoder 106 can be used to process the output of the timing control circuit 101 and the digital dot matrix data stored in the display memory unit 103 to thereby generate the Cvideo signal. The Cvideo signal is used directly to drive the CRT TV and is also transferred to the LCD driving circuit for further processing to obtain a suitable signal form that can be used to drive the LCD.

The LCD includes an array of pixels, each pixel consisting of a red dot (R), a green dot (G), and a blue dot (B). These RGB dots are digitally controlled to display their associated colors in various intensity levels which are combined to show the prescribed colors of the video image. The involved techniques are conventional and not within the spirit of the invention, so description thereof will not be further detailed.

Since the LCD is different in structure and display method from the CRT TV, the analog Cvideo signal needs to be further processed before the video image can be displayed on the LCD. The LCD driving circuit is the bottom part of the circuit of FIG. 1, which includes a video decoder 111, a video amplifier 112, an analog gamma-correction circuit 113, a video inversion circuit 114, a synchronizing signal separator 120, an LCD timing control circuit 121, a phase locked loop (PLL) circuit 122, a shut-down circuit 130, a pulse width modulator (PWM) 131 and a filtering circuit 132.

As shown, in the LCD driving circuit, the Cvideo signal is first received by the video decoder 111 which then decomposes the Cvideo signal into the respective RGB signals and the composite synchronizing signal Csync. The output RGB signals are then transferred to the video amplifier 112, while the output Csync signal is transferred to the synchronizing signal separator 120.

The video amplifier 112 amplifies the RGB signals to a suitable level and then transfers the amplified RGB signals to the analog gamma-correction circuit 113 for gamma correction of the RGB signals. Gamma correction is a conventional technique for adjusting the intensity and color quality of RGB signals. It is well known to those skilled in the art so description thereof will not be further detailed. The output of the analog gamma-correction circuit 113 is then transferred to the video inversion circuit 114 for selective polarity inversion of the lines in the video signal. The polarity inversion process is performed in such a manner that neighboring lines in the video signal are designated with the opposite polarities; for instance, the odd-numbered lines (i.e., the 1st, the 3rd, the 5th, . . . lines) are positively polarized, while the even numbered lines (i.e., the 2nd, the 4th, the 6th, . . . lines) are negatively polarized. The technique involved for such inversion is also a conventional technique so description thereof will not be further detailed.

Meanwhile, the output Csync signal from the video decoder 111 is processed by the synchronizing signal separator 120 which decomposes the Csync signal into the original horizontal synchronizing signal Hs and the vertical synchronizing signal Vs. The horizontal synchronizing signal Hs is then transferred to both the LCD timing control circuit 121 and the PLL circuit 122. The output of the PLL circuit 122 in response to the input horizontal synchronizing signal Hs is conventionally called a pixel clock signal (abbreviated as P-CLK). The LCD timing control circuit 121 takes the vertical synchronizing signal Vs, the horizontal synchronizing signal Hs and the P-CLK signal as inputs, and then processes these signals to obtain the various video control signals required to drive the LCD to display the video image.

Moreover, since the LCD includes a positive plate and a negative plate with different types of transistors, two different DC voltages are required to drive the LCD. These DC voltages are produced by the PWM circuit 131 and the filtering circuit 132. The technique involved for supplying these two DC voltages by the PWM circuit 131 and filtering circuit 132 is also conventional and not within the spirit of the invention, so description thereof will not be further detailed.

The LCD receives the output of the video inversion circuit 114, the output of the LCD timing control circuit 121, the output P-CLK signal from the PLL circuit 122 and the output of the PWM circuit 131. These signals, in cooperation, drive the LCD to display the video image.

When the LCD is not in active use, i.e., no video signal is received, it can be shut down by the shutdown circuit 130. This provision allows the display system to save power consumption when no video image is being displayed on the LCD.

The foregoing conventional LCD driving circuit, however, has several draw-backs.

(1) First, the display of the digital dot-matrix data originally stored in the display memory unit 103 suffers from a reduced fidelity when being displayed on the LCD since these data are first processed into analog form so as to be displayable on the CRT TV and then processed in a reverse manner into digital form so as to be subsequently displayable on the LCD. The fidelity of the displayed image on the LCD is therefore considerably degraded.

(2) Second, the LCD driving circuit used to drive the LCD requires the use of quite a large number of circuit components, which causes the manufacturing cost of the LCD driving circuit to be considerably high.

(3) Third, since a large number of circuit components are required, the circuit layout space on the integrated circuit is correspondingly large, causing the integrated circuit to be less compact in size.

(4) Fourth, since a large number of circuit components are required, power consumption by the LCD driving circuit will be large, which makes the utilization of the display system less cost-effective.

(5) Fifth, since the Cvideo signal from the CRT TV driving circuit needs to be further processed so as to be displayable on the LCD, the LCD driving circuit requires the use of a large number of circuit components to process the Cvideo signal and these circuit components, such as the voltage control oscillator (VCO) in the PLL circuit and the video decoder, require various adjustments before the LCD driving circuit can be operable. These requirements considerably increase the manufacturing cost of the LCD driving circuit.

(6) Sixth, the analog gamma-correction circuit 113 is at most capable of making two- or three-stage linear gamma correction on the video signal, which still does not allow the corrected video signal to be displayed with the optimal fidelity.

SUMMARY OF THE INVENTION

It is therefore an objective of the present invention to provide a digital LCD driving circuit which is implemented in an LSI integrated circuit with the purpose of overcoming the foregoing drawbacks.

It is another objective of the present invention to provide a digital LCD driving circuit which processes the digitized video signal in a digital manner that utilizes a digital gamma-correction means instead of an analog one so as to achieve the optimal gamma correction for the video image to be displayed on the LCD.

In accordance with the foregoing and other objectives of the present invention, an improved digital LCD driving circuit is provided.

The LCD driving circuit of the invention comprises a digital gamma-correction and inversion circuit, which is coupled to receive a digitized video signal, for performing a digital gamma-correction process on the digitized video signal and then performing a polarity inversion process on selected lines of the gamma corrected video signal.

A digital-to-analog conversion means is coupled to said digital gamma-correction and inversion circuit for converting the digital output of said digital gamma-correction and inversion circuit into analog form.

Further, the LCD driving circuit of the invention comprises an LCD timing control circuit, which is coupled to receive a plurality of video control signals associated with the digitized video signal, for converting the video control signals into an LCD timing control signal to control the display of the associated digitized video signal on the LCD.

Still further, the LCD driving circuit of the invention comprises a PWM and shutdown circuit for supplying power to the LCD and shutting down the LCD when the LCD has been idle for a preset period.

Most of the constituent circuit components of the LCD driving circuit of the invention can be implemented in a single LSI integrated circuit. The LCD driving circuit of the invention is therefore compact in size, low in manufacturing cost and low in power consumption.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 2:
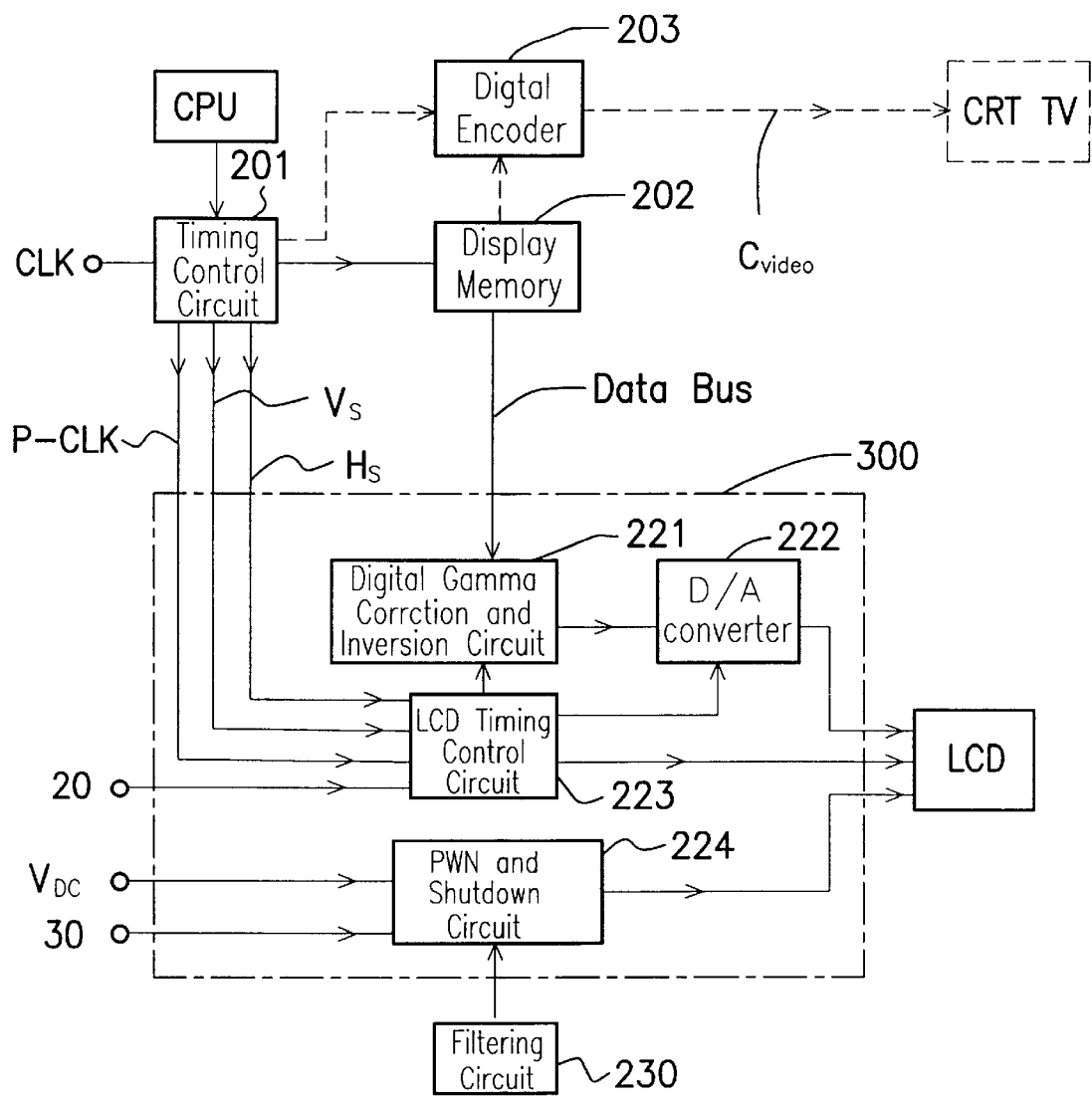
FIG. 2 is a schematic block diagram showing a preferred embodiment of the LCD driving circuit according to the invention.

FIG. 2 is a schematic block diagram showing a preferred embodiment of the LCD driving circuit according to the invention.

Figure 1:
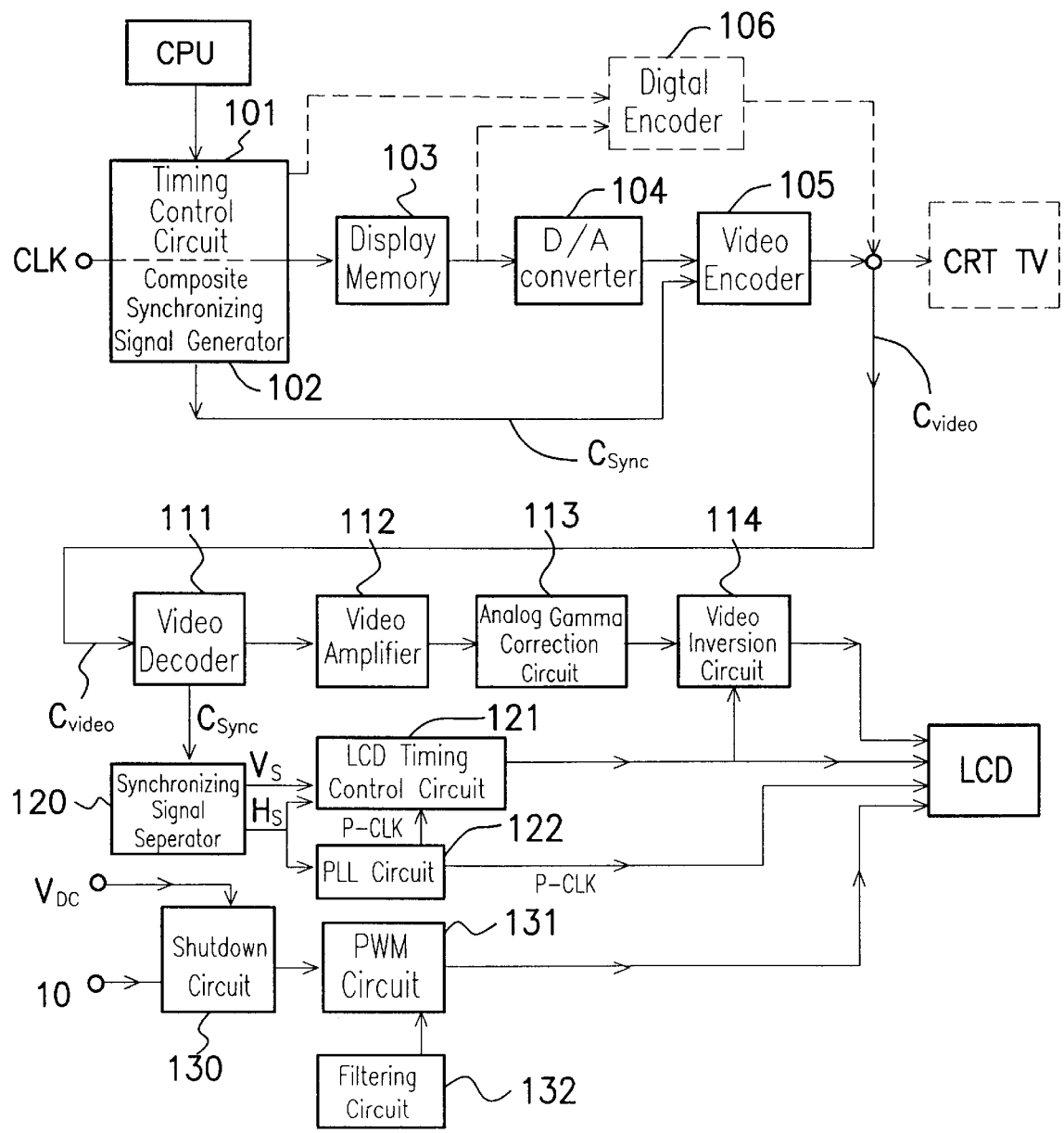
FIG. 1 is a schematic block diagram showing a conventional display driving circuit for driving a CRT TV and an LCD to display video images.

In FIG. 2, the driving circuit for the CRT TV includes a timing control circuit 201, a display memory unit 202 and a digital encoder 203, which are operated cooperatively to produce the Cvideo signal used to drive the CRT TV. This CRT TV driving circuit is substantially the same as that shown in the prior art of FIG. 1.

The LCD driving circuit of the invention is the part of the circuit of FIG. 2 that is enclosed in a dashed box indicated by the reference numeral 300. It is devised to drive the LCD to display the digitized video image stored in the display memory unit 202 under control of the horizontal synchronizing signal Hs, the vertical synchronizing signal Vs and the P-CLK signal from the timing control circuit 201. In practice, the LCD driving circuit can be implemented together with the CRT TV driving circuit in an LSI integrated circuit. Alternatively, the LCD driving circuit 300 can be an independent functional unit used to drive an individual LCD.

As shown in FIG. 2, the LCD driving circuit 300 includes a digital gamma-correction and inversion circuit 221, a D/A converter 222, an LCD timing control circuit 223 and a PWM and shutdown circuit 224.

In operation, the output horizontal synchronizing signal Hs, the vertical Synchronizing signal Vs and the P-CLK signal from the timing control circuit 201 are directly transferred to the LCD timing control circuit 223 in the LCD driving circuit 300. The LCD timing control circuit 223 then processes these signals to thereby generate the various video control signals required to drive the LCD. Compared to the prior art of FIG. 1, in which these signals are first combined to formed the Csync signal and then decomposed to obtain their original forms to drive the LCD, it is apparent that the invention is more efficient in operation.

The LCD timing control circuit 223 further includes a resolution setting means 20 which allows the user to set a desired resolution for the LCD to display the video image. When a desired resolution is set, the LCD timing control circuit 223 can adjust the LCD to the user-set resolution simply by changing the states of logic signals that are used to control the resolution of the LCD. Compared to the prior art of FIG. 1 in which the peripheral components of the PLL circuit should be changed when a different resolution is to be set, it is apparent that the invention is more convenient to use.

The digitized video image that is to be displayed on the LCD is transferred directly from the display memory unit 202 to the digital gamma-correction and inversion circuit 221. The digital gamma-correction and inversion circuit 221 first performs a digital gamma-correction process on the digitized video signal, and then performs a selective polarity inversion process on the corrected video signal for selective polarity inversion of the lines of the video signal. As described in the background section of this specification, the purpose of the selective polarity inversion process is to make neighboring lines in the video display to be opposite in polarity; for instance the odd-numbered lines (1st, 3rd, 5th, . . . lines) are positively polarized, while the even-numbered lines (2nd, 4th, 6th, . . . lines) are negatively polarized. The digital output from the digital gamma-correction and inversion circuit 221 is then transferred to the D/A converter 222 to be converted into analog form that can be displayed on the LCD. Compared to the prior art of FIG. 1 in which the digitized video signal from the display memory unit 103 are processed through many stages (i.e., the D/A converter 104, the video encoder 105, the video decoder 111, the video amplifier 112) before being received and processed by the analog gamma-correction circuit 113 and video inversion circuit 114, it is apparent that the invention is more efficient in operation and makes the overall circuit structure less complex.

Furthermore, the LCD driving circuit 300 utilizes the PWM and shutdown circuit 224 to provide all the DC voltages needed to power the various parts of the LCD. In operation, the PWM and shutdown circuit 224 receives an external voltage $V_{DC}$ and, in conjunction with the filtering circuit 230, converts the voltage $V_{DC}$ into the various DC voltages that are used to power the various parts of the LCD.

The PWM and shutdown circuit 224 further includes a shutdown trigger input port 30. When the LCD has been idle for a preset period, a shutdown trigger signal will be input to the PWM and shutdown circuit 224 via this port 30, causing the PWM and shutdown circuit 224 to shut down the LCD for the purpose of saving power consumption.

In conclusion, the LCD driving circuit of the invention has the following advantages over the prior art.

(1) First, since most of the constituent circuit components of the LCD driving circuit (except the filtering circuit) can be implemented in a single LSI integrated circuit, the IC product of the LCD driving circuit is very compact in size, low in manufacturing cost, and low in power consumption.

(2) Second, the overall display driving circuit for the CRT TV and LCD is also more simplified in structure while nonetheless provides the same driving function with even greater improvement in performance and fidelity.

(3) Third, the invention allows the digitized video signal to be directly digitally processed so that the video image can be displayed without much loss in fidelity. It also allows the driving circuit to be more cost-effective to implement and to be constructed with a reduced number of circuit components. The LCD driving circuit consumes less power and can be operated without the need to make the many analog adjustments of the prior art.

(4) Fourth, the digital gamma-correction and inversion circuit 221 performs the gamma correction on the video signal in a digital manner instead of analog manner as in the prior art. The gamma correction can thus be performed based on the characteristics of the LCD to provide the optimal and finest correction.

(5) Fifth, the digital nature of the LCD driving circuit of the invention allows the various resolutions of the LCD to be selectable through digital means (in this case, the resolution setting means 20). The resolution setting is therefore more convenient than the prior art in which some peripheral components of the PLL circuit need to be replaced when a different resolution is to be set.

The invention has been described using exemplary preferred embodiments. However, it is to be understood that the scope of the invention is not limited to the disclosed embodiments. On the contrary, it is intended to cover various modifications aid similar arrangements. The scope of the claims, therefore, should be accorded the broadest interpretation so as to encompass all such modifications and similar arrangements.

What is claimed is:

1. An LCD driving circuit for driving an LCD to display a video image, comprising:

a digital gamma-correction and inversion circuit, coupled to directly receive a digitized video signal from a display memory, for performing a digital gamma-correction process on the digitized video signal and then performing a polarity inversion process on selected lines of the gamma corrected video signal;

a digital-to-analog conversion means, coupled to said digital gamma-correction and inversion circuit, for converting the digital output of said digital gamma-correction and inversion circuit into analog form; and an LCD timing control circuit, coupled to an external time control circuit, said digital gamma-correction and inversion circuit, and said digital conversion means, to directly receive a plurality of video control signals associated with the digitized video signal, for converting the video control signals into an LCD timing control signal to control the display of the digitized video signal on the LCD; and a PWM and shutdown circuit for supplying power to the LCD and shutting down the LCD when the LCD has been idle for a preset period.

2. The LCD driving circuit of claim 1, wherein said digital gamma-correction and inversion circuit is coupled to a display memory unit in which the data of the digitized video signal are stored, so as to fetch the digitized video signal directly from said display memory unit.

3. The LCD driving circuit of claim 1, wherein said plurality of video control signals received by said LCD timing control circuit include a horizontal synchronizing signal, a vertical synchronizing signal and a pixel clock signal.

4. The LCD driving circuit of claim 1, wherein said LCD timing control circuit comprises a means for setting a user-desired resolution for the LCD to display the video image based on a logic signal representative of the user-set resolution.

5. The LCD driving circuit of claim 1, wherein said PWM and shutdown circuit is used in conjunction with a filtering circuit to convert an input DC voltage to the power required to drive the LCD and said PWM and shutdown circuit shuts down the LCD in response to a shutdown trigger signal.

6. The LCD driving circuit of claim 1, wherein said digital gamma-correction and inversion circuit performs the polarity inversion process in such a manner that odd-numbered lines are positively polarized while even-numbered lines are negatively polarized.

7. An LCD driving circuit for driving an LCD to display a video image, comprising:

a digital gamma-correction and inversion circuit, coupled to directly receive a digitized video signal from a display memory, for performing a digital gamma-correction process on the digitized video signal and then performing a polarity inversion process on selected lines of the gamma corrected video signal;

a digital-to-analog conversion means, coupled to said digital gamma-correction and inversion circuit, for converting the digital output of said digital gamma-correction and inversion circuit into analog form; and an LCD timing control circuit, coupled to an external time control circuit, said digital gamma-correction and inversion circuit, and said digital conversion means, to directly receive a plurality of video control signals associated with the digitized video signal, for converting the video control signals into an LCD timing control signal to control the display of the digitized video signal on the LCD.

8. The LCD driving circuit of claim 7, wherein said PWM and shutdown circuit is used in conjunction with a filtering circuit to convert an input DC voltage to the power required to drive the LCD and said PWM and shutdown circuit shuts down the LCD in response to a shutdown trigger signal.

9. The LCD driving circuit of claim 7, wherein said digital gamma-correction and inversion circuit is coupled to a display memory unit in which the data of the digitized video signal are stored, so as to fetch the digitized video signal directly from said display memory unit.

10. The LCD driving circuit of claim 7, wherein said plurality of video control signals received by said LCD timing control circuit include a horizontal synchronizing signal, a vertical synchronizing signal and a pixel clock signal.

11. The LCD driving circuit of claim 7, wherein said LCD timing control circuit comprises:

means for setting a user-desired resolution for the LCD to display the video image based on a logic signal representative of the user-set resolution.

* * * * *